United States Patent [19]

Kusumoto

[11] Patent Number: 4,968,872
[45] Date of Patent: Nov. 6, 1990

[54] IMAGE FORMING APPARATUS

[75] Inventor: Keiji Kusumoto, Osaka, Japan

[73] Assignee: Minolta Camera Kabushiki Kaisha, Osaka, Japan

[21] Appl. No.: 276,875

[22] Filed: Nov. 28, 1988

[30] Foreign Application Priority Data

Nov. 27, 1987 [JP] Japan ................ 62-301097

[51] Int. Cl.$^5$ ............................................. H05B 1/02
[52] U.S. Cl. ................................. 219/497; 219/508; 219/505; 219/494; 219/501; 355/290
[58] Field of Search ............... 219/490, 252, 494, 497, 219/499, 501, 505, 506, 241, 242; 323/235, 236, 319; 355/14 FU, 3 FU

[56] References Cited

U.S. PATENT DOCUMENTS

| | | | |
|---|---|---|---|
| 3,936,658 | 2/1976 | Traister et al. | 219/216 |
| 4,282,423 | 8/1981 | Volz | 219/490 |
| 4,320,285 | 3/1982 | Koether | 219/508 |
| 4,367,399 | 1/1983 | Anthony et al. | 219/508 |
| 4,493,984 | 1/1985 | Yamuchi | 219/497 |
| 4,677,282 | 6/1987 | Walsh | 219/497 |

FOREIGN PATENT DOCUMENTS

2809089 9/1979 Fed. Rep. of Germany ...... 219/241

56-161558 12/1981 Japan .
62-195876 8/1987 Japan .

*Primary Examiner*—M. H. Paschall
*Attorney, Agent, or Firm*—Burns, Doane, Swecker & Mathis

[57] ABSTRACT

The present invention relates to an image forming apparatus such as a copying machine and the like, and more in particular to the temperature control at a fixing unit thereof. In the image forming apparatus according to the present invention, the temperature of the fixing unit is controlled to be kept at the first set point by the first temperature control structure in normal operation, and when the temperature of the fixing unit comes to reach the second set point as a result of the first temperature control structure getting out of order, the temperature of the fixing unit is controlled to be kept at the second set point by the second temperature control structure. Consequently, the temperature of the fixing unit can be controlled to be kept within a desired range even when the first temperature control means gets out of order. As a result, it is possible not only to prevent thermal damages of parts caused by temperature rise at the fixing unit, but also to aim at improving the quality of prints as well as carrying out power saving.

10 Claims, 6 Drawing Sheets

IMAGE FORMING APPARATUS

BACKGROUND OF THE INVENTION

1. Field of the Invention

The present invention relates to an image forming apparatus such as a copying machine and the like, and more in particular, to the temperature control at the fixing unit where a toner image transferred onto a paper or the like is dissolved and fixed.

2. Description of the Related Art

The fixing unit of a copying machine is a unit where a toner image fed from a photosensitive drum and transferred onto a paper is dissolved and fixed onto the paper by fixing rollers. For this purpose, the fixing rollers are provided with a heater lamp for heating.

The fixing rollers are controlled to be kept at temperature previously set according to the size and thickness of the paper, or to circumstances whether the copying machine is in a ready state or in operation, for example. This control is carried out by detecting the temperature on the fixing roller by means of a thermister or the like, and then by lighting and putting out the heater lamp.

Such a temperature control at the fixing unit as mentioned above makes it possible to bring about improvement of the quality of prints as well as power saving. Therefore, delicate temperature control is desirable.

For this purpose, some machines have recently appeared wherein it is possible to carry out delicate temperature control by putting temperature-detecting signals from a thermister or the like in the analogue port of a microcomputer as control section and by carrrying out the temperature control through software.

In the temperature control through software, however, the fixing unit suffers from abnormally high temperature in a case where software has got out of order by unexpected noises or the like to keep the heater lamp turned on. So a temperature fuse is installed as a means for preventing finally occurrences of fires or the like. But there is a danger of deformations being caused in parts such as gears and the like of synethtic resin to bring about serious, mechanical damages, before the fuse is blown.

SUMMARY OF THE INVENTION

The present invention has been made in order to solve the aforementioned problem. In an image forming apparatus according to the present invention, the temperature of a fixing unit is controlled to be kept normally at a first set point by means of a first temperature control means. When the first temperature control means gets out of order and the temperature of the fixing unit reaches a second set point, a changeover means functions and the temperature control is carried out by a second temperature control means so that the temperature of the fixing unit be kept at the second set point.

A first object of the present invention is to provide an image forming apparatus wherein it is possible to prevent the fixing unit from suffering from abnormally high temperature by carrying out the temperature control successively by the second temperature control means.

A second object of the present invention is to provide an image forming apparatus wherein there is no fear of the parts suffering from thermal damages.

A third object of the present invention is to provide an image forming apparatus wherein it is possible to aim at improving the quality of prints as well as carrying out power saving.

The above and further objects and features of the invention will more fully be apparent from the following detailed description with accompanying drawings.

DESCRIPTION OF THE PREFERRED EMBODIMENTS

Figure 1:
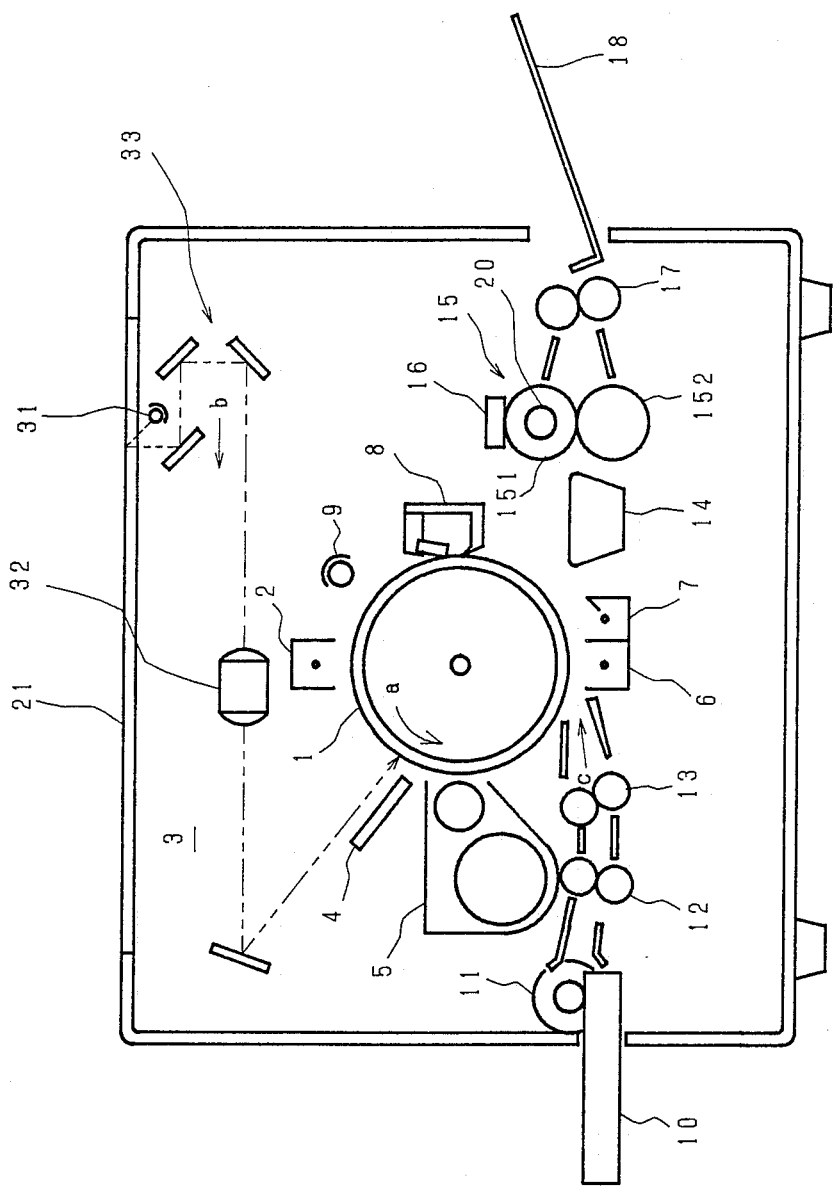
FIG. 1 is a schematic view showing the inner structure of an image forming apparatus (a copying machine) according to the present invention.

The present invention will described with reference to the drawings showing one embodiment of a copying machine according thereto. In FIG. 1, the numeral 1 denotes a photosensitive drum which has a photoconductive layer on the outer peripheral surface thereof and is capable of rotation-driving in the direction shown by an arrow a. Above the photosensitive drum 1, a charger 2 is disposed, which gives a predetermined quantity of charges (positive charges in the present embodiment) to the surface of the photosensitive drum 1.

An image exposure device 3 is installed under a document table 21. The image exposure device 3 comprises a group of mirrors 33, an exposure lamp 31, a lens 32 and the like, moving in the direction shown by an arrow b, and forms one the surface of the photosensitive drum 1 an electrostatic latent image corresponding to the document placed on the document table 21. A LED array 4 and a developing device 5 are installed at positions in the direction of rotation of the photosensitive drum 1 with respect to the charger 2 in order of the direction of rotation. The LED array 4 has a function top remove the charges at irrelevant portions, so called a function to erase space-between-images or margin-of-images, in order to prevent adhesion of excessive toner at the developing device 5. The developing device 5 makes the electrostatic latent image formed on the surface of the photosensitive drum 1 by the magnetic brush method into a toner image. A transferring charger 6 is installed below the photosentive drum 1. The transferring charger 6 gives an electric field to a paper (not shown in the drawings) fed in the direction shown by an arrow c from the reverse side thereof, and transfers the toner image formed on the surface of the photosensitive drum 1 onto the paper. A separating charger 7 is disposed in the direction of rotation of the photosensitive drum 1 with respect to the transferring charger 6. The separating charger 7 removes the charges from the paper by giving it immediately after transferring an AC electric field and separates it from the surface of the photosensitive drum 1.

A cleaning device 8 is disposed in the direction of rotation of the photosensitive drum 1 with resepct to the separating charger 7. The cleaning device 8 removes the toner remained on the surface of the photosensitive drum 1 by the blade method. An eraser lamp 9 is disposed at a position between the cleaning device 8 and the charger 2. The eraser lamp 9 removes the charges remained on the surface of the photosensitive drum 1 by photoradiation in order to prepare for the next copying treatment.

The numeral 10 denotes a cassette where the papers are housed and this cassette 10 is capable of mounting to and demounting from the copying machine main unit. The cassette 10 is provided with a paper feed roller 11 for feeding out papers. The paper fed out from the cassette 10 is fed to a region between the photosensitive drum 1 and the transferring charger 6, as shown by an arrow c, via intermediary rollers 12 with a timing controlled by timing rollers 13. There the toner image is transferred onto the paper, and thus transferred paper is fed into a fixing unit 15 by means of carrying belt 14.

The fixing unit 15 comprises an upper fixing roller 151, a lower fixing roller 152, a heater lamp 20 which is built in the upper fixing roller 151 and the like. A thermister 16 is disposed at the top of the upper fixing roller 151 for detecting the temperature thereof. The toner image which has been transferred onto the paper is dissolved and fixed by fixing rollers 151 and 152, and then the paper is discharged on a copy receiving tray 18 by discharging rollers 17.

Figure 2:
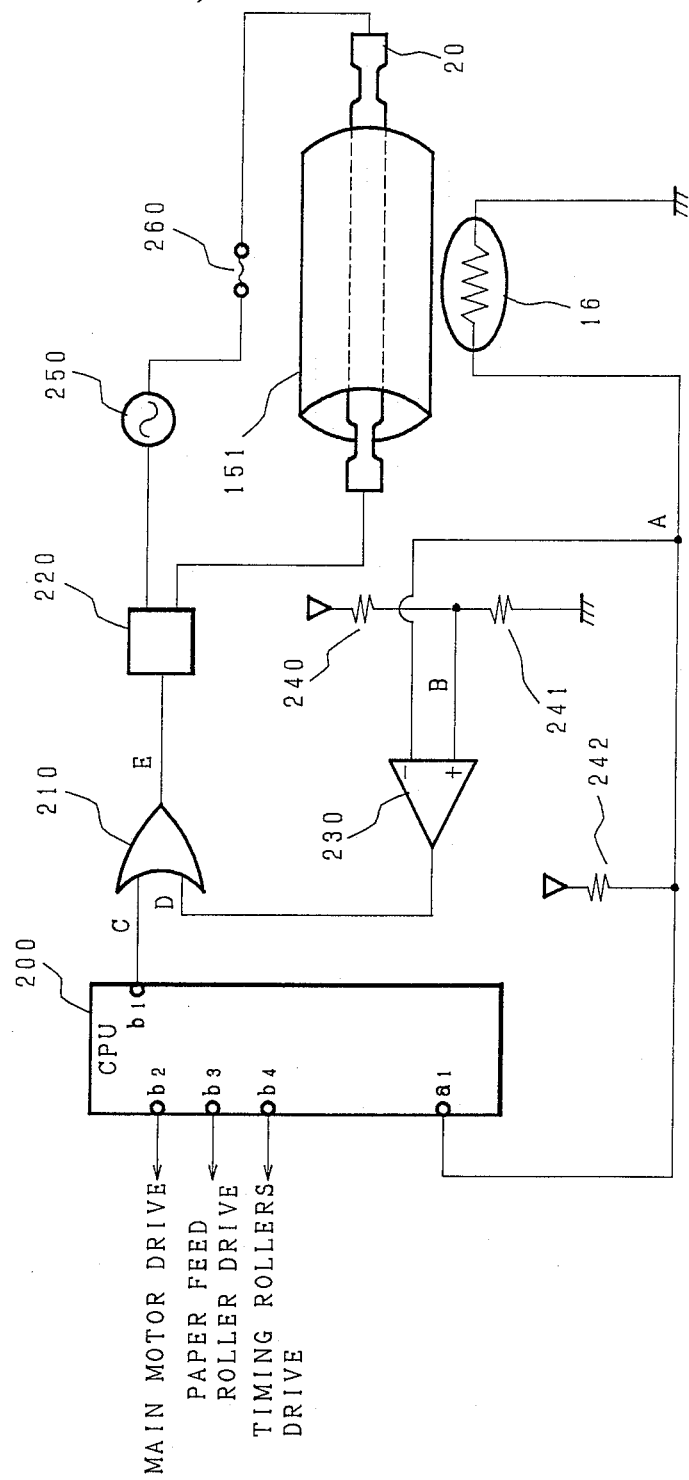
FIG. 2 is a block diagram of a principal part of the control circuits of an image forming apparatus (a coping machine) according to the present invention.

In FIG. 2, the numeral 200 denotes a CPU which is the control nucleus of the apparatus according to the present invention, and an A/D converter is built in it. The detecting signal A of the thermister 16 is divided by a resistor 242 to be put in an analogue input port $a_1$ of the CPU 200 and a reverse input terminal of a comparator 230 respectively.

An input signal C is put in one input terminal of an OR circuit 210 from an output port $b_1$ of the CPU 200. An input signal D is put in the other input terminal of the OR circuit 210 from the comparator 230. Drive ICs (not shown in the drawings) are connected to output ports $b_2$, $b_3$ and $b_4$ of the CPU 200. A main motor (not shown in the drawings), the paper feed roller 11 and the timing rollers 13 are driven respectively, in these drive ICs. The CPU 200 is constructed in such manner that it may put in and put out various signals (not shown in the drawings) relating to copying motions besides the signals mentioned above.

An output signal E is put out from the OR circuit 210 to a control terminal of a SSR 220. The SSR 220 controls to turn on and turn off a power source 250 which turns on the heater lamp 20 built in the upper fixing roller 151. Between the power source 250 and the heater lamp 20 is disposed a temperature fuse 260 near the upper fixing roller 151. The temperature fuse 260 is provided for the purpose of preventing occurrence of fire or the like in the case where the temperature of the fixing unit 15 rises abnormally due to an unexpected accident. The critical temperature of the temperature fuse 260 is set at a high point where it will not be blown under normal copying operation, for example, at 300° C.

A prescribed voltage B divided by resistors 240 and 241 is applied to a non-reverse input terminal of the comparator 230. The voltage B corresponds to a fixing control temperature (hereinafter called a second set point) $T_2$ through hardware which will be described later.

In the control circuits as constructed in this way, the detecting signal A of the thermister 16 is converted to a digital value in the CPU 200. The temperature control at the fixing unit 15 is carried out by allowing the heater lamp 20 to turn on or turn off, in accordance with this digital value. The output signal E of the OR circuit 210 comes to be on a low level when the input signals C and D of the OR circuit 210 are all on low levels, so the SSR 220 is made to operate to turn on the heater lamp 20. In this connection, the input signal D is also the output signal of the comparator 230. The voltage B corresponding to the second set point $T_2$ is applied to the non-reverse input terminal of the comparator 230. This second set point $T_2$ is set at a temperature higher than that in normal states as when the copying machine is in the ready state or when the copying machine is in operation, that is, the fixing control temperature (hereinafter called a first set point) $T_1$ through software. Therefore, in a normal state, the voltage of the detecting signal A of the thermister 16 which is put in the reverse input terminal of the comparator 230 is higher than the voltage B. The output signal of the comparator 230 is on a low level, and the input signal D of the OR circuit 210 is also on a low level. As an example, $T_1$ is 170° C. and $T_2$ 200° C.

In a normal state, the temperature control at a first set point $T_1$, that is, at around 170° C. is carried out by the CPU 200. If the software of the CPU 200 gets out of order due to unexpected noises or the like to cause the output port $b_1$ of the CPU 200 to latch at a low level, the heater lamp 20 remains lighting. And when the temperature of the fixing unit rises above $T_2$, that is, above 200° C., the voltage of the detecting signal A of the thermister 16 comes to be lower than the voltage B applied to the non-reverse input terminal of the comparator 230. As a result, an abnormal state is detected. At this time the input signal D comes to be on a high level, and the output signal E is on a high level. As a result, the SSR 220 comes to be in non-operation. The power source 250 is broken, and the heater lamp 20 is turned off. Then, the temperature control at 200° C. is carried out through hardware of the comparator 200.

Figure 3:
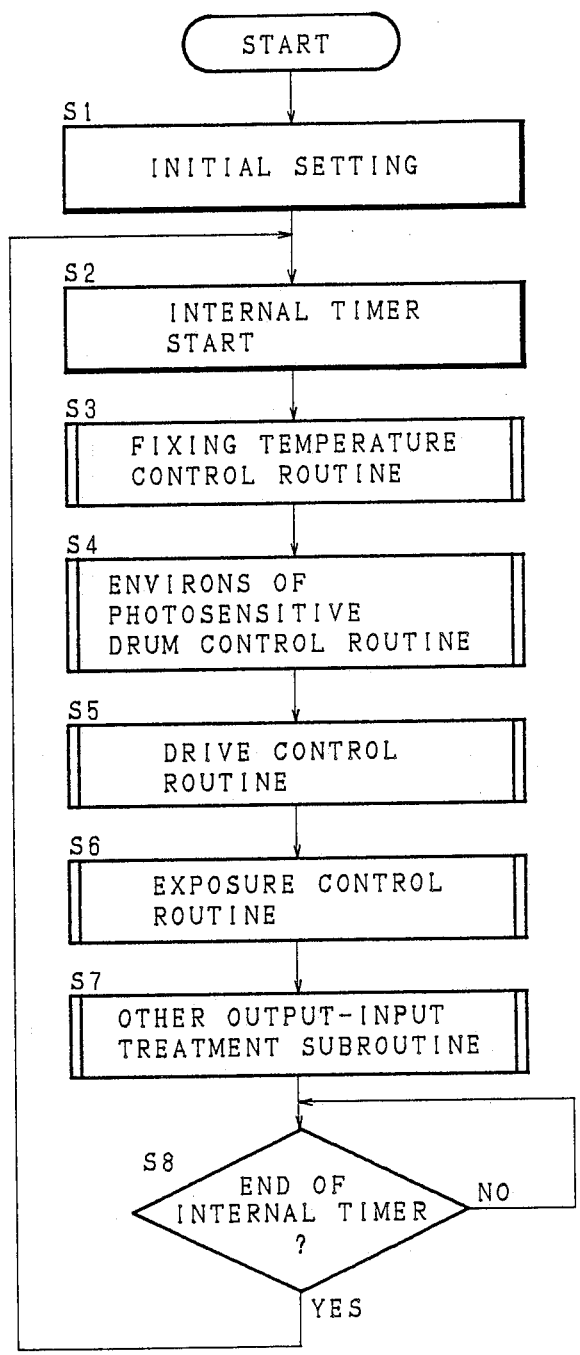
FIG. 3 and FIG. 4 are flow charts showing the control order for a CPU.

In the flow chart in FIG. 3, the power source is turned on to allow the CPU 200 to reset, and the program starts. Firstly, at step S1 the initial setting is carried out in order to clear RAM (not shown in the drawings), initialize each register and put each device in the initial mode.

Next, at step S2, an internal timer is started. This internal timer functions in order to determine the time required for one routine of the main routine irrespective of the contents treated in each sub-routine to be explained below. The timer value for it has been previously set at step S1.

Then, sub-routines shown by steps S3 to S7 are called one by one, and the treatments in all sub-routines end. At step S8, waiting for ending of the internal timer, the process returns to step S2. Counting operations by timers used in each sub-routine are carried out on the basis of the time span required in this one routine.

Step S3 is a fixing temperature control routine in software. The content of this routine will be described later with reference to the flow chart shown in FIG. 4.

Step S4 is a control routine for the environs of the photosenstive drum 1. Here controlling operations of chargers, developing device 5 and the like are carried out. At next steps S5 and S6, driving-controlling operations of the main motor, rollers and the like and scanning-controlling of the image exposure device 3 are carried out.

Figure 4:
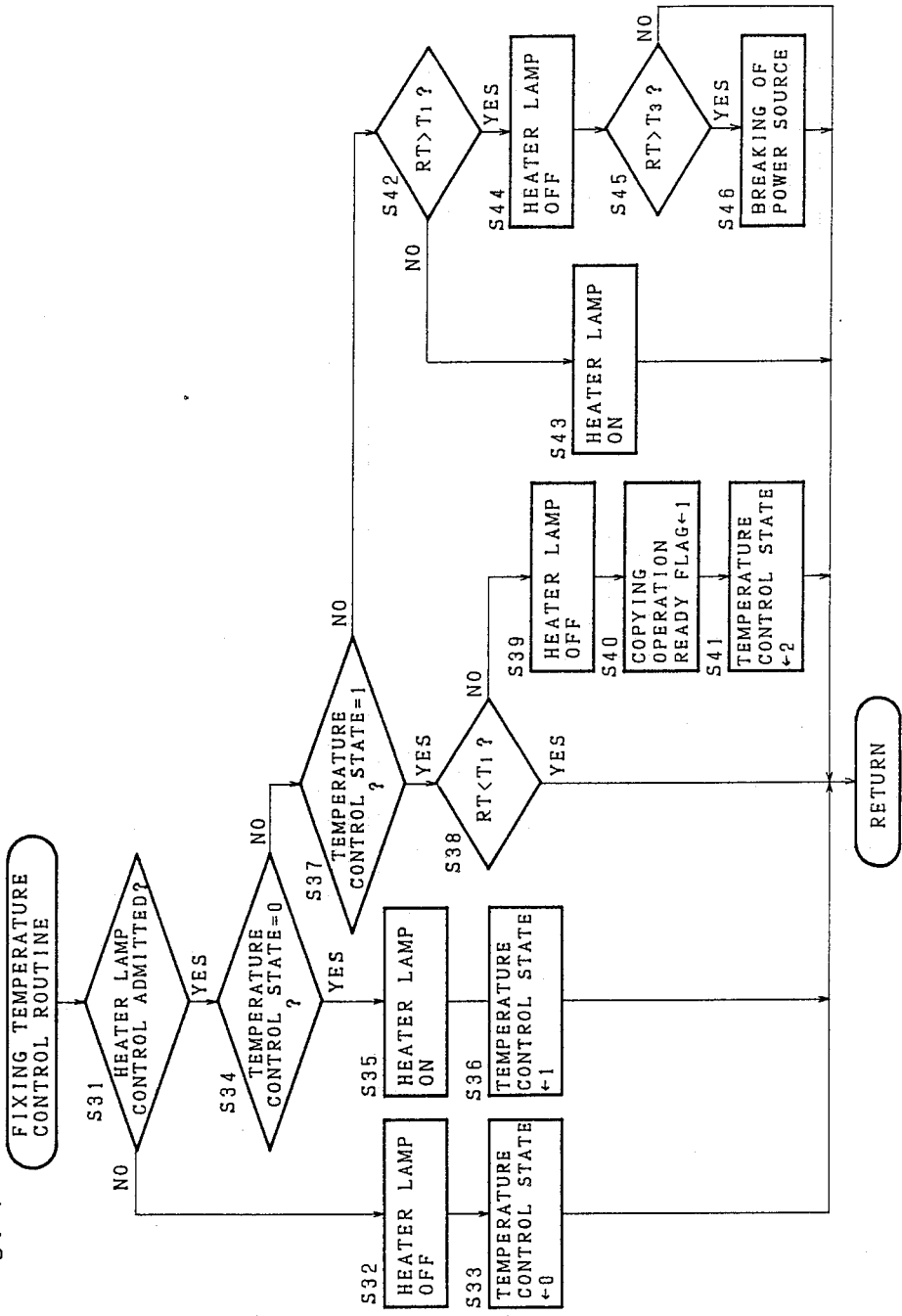

FIG. 4 shows an example of the fixing temperature control routine. Actually, delicate temperature controls are done in accordance with the size and thickness of the paper, or circumstances whether the copying machine is in operation or in a ready state, for example. Here a control to maintain the fixing temperature at a first set point $T_1$ will be shown in view of the important regard in the present invention. At step S31, whether the heater lamp 20 is at a state where its control may be admitted or not is discriminated. Such a discriminating signal is emitted in other proper subroutine.

If the control of the heater lamp 20 is not admitted at step S31, the heater lamp 20 is turned off at step S32, that is, the output port $b_1$ of the CPU 200 is caused to be on a high level. At the next step S33 the temperature control state is reset ($=0$) and the process returns to the main routine. If the control of the heater lamp 20 is admitted, this temperature control state is set to the value 1 or the value 2 according to the control state.

If the control of the heater lamp 20 is admitted at step S31, the content of the temperature control state is checked at steps S34 and S37. In the case where the temperature control state takes the value 1, the heat lamp 20 is turned on at step S35, and the temperature control state is set to the value 1 at step S36. When the temperature control state comes to be at the value 1, the temperature RT of the upper fixing roller 151 detected by the thermister 16 is compared with a first set point $T_1$ at step S38. In the case where RT is lower than $T_1$, the process returns to the main routine, and the heater lamp 20 continues lighting. If RT is not less than $T_1$, the heat lamp 20 is turned off at step S39. After a copying operation ready flag is set at step S40, the temperature control state is set to the value 2 at step S41 and the process returns to the main routine. The copying operation ready flag is a flag which indicates that the machine is at a state where the copying operation is possible as the temperature of the upper fixing roller 151 is at a prescribed point ($T_1$). In accordance with this flag, treatments such as lightening a print switch in green on the operation panel of the machine, for example, are carried out in other sub-routines. Then, receiving an order to copy the document starts.

When the temperature control state comes to be at the value 2, the temperature RT is compared with a first set point $T_1$ at step S42. If RT is not more than $T_1$, the heater lamp 20 is turned on at step S43, and the process returns to the main routine. If RT is higher than $T_1$, the heater lamp 20 is turned off at step S44. Next, RT is compared with an abnormality-detecting temperature $T_3$ at step S45. If RT is not more than $T_3$, the process likewise returns to the main routine to keep the temperature RT at a first set point $T_1$. If RT is higher than $T_3$, the breaking of the current from the power source 250 is carried out at step S46. This breaking operation is not carried out by the SSR 220 but by a relay (not shown in the drawings). The abnormality-detecting temperature $T_3$ is set at 250° C., for example.

Figure 5:
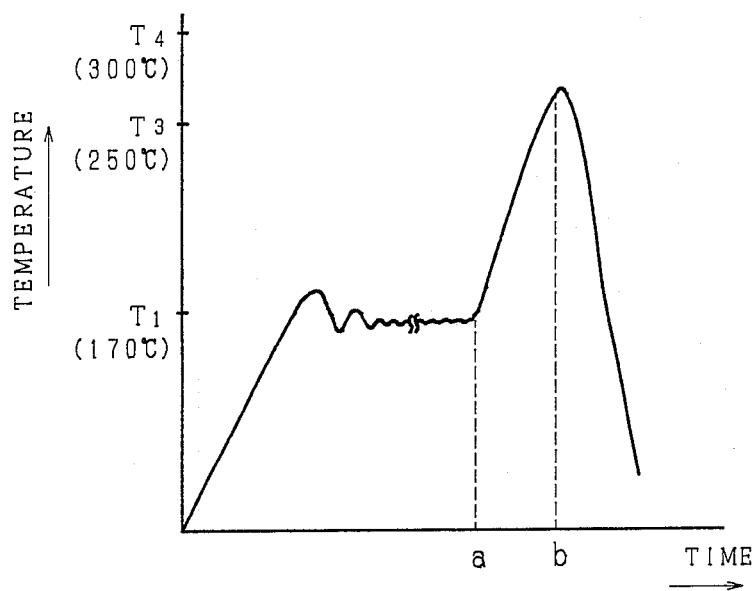
FIG. 5, 6 and 7 are graphs showing the temperature control state at the fixing unit of the apparatus according to the present invention.
Figure 6:
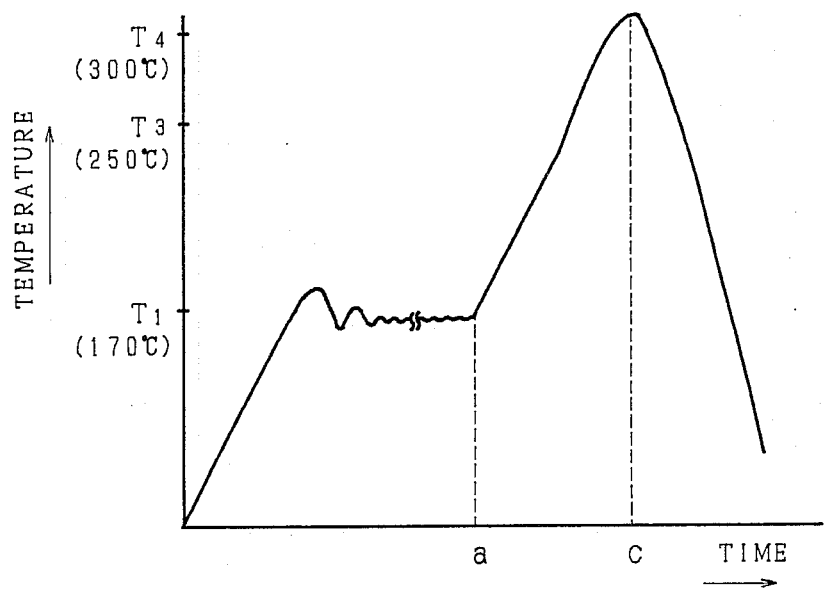

The temperature control at the fixing unit 15 (the upper fixing roller 151) is explained with reference to the graphs shown in FIGS. 5, 6 and 7. In these figures, the horizontal line denotes time, and the vertical line the temperature of the fixing unit 15. As describe above, signals $T_1$ ($=170°$ C.) and $T_2$ ($=200°$ C.) denote the fixing control temperatures through software and hardware respectively, while the signal $T_3$ ($=250°$ C.) denotes an abnormality-detecting temperature and the signal $T_4$ ($=300°$ C.) a critical temperature of the temperature fuse 260. FIGS. 5 and 6 shown the temperature control through conventional software alone, that is, the temperature control in the case as shown in FIG. 2 where the output port $b_1$ of the CPU 200 is directly connected to the control teminal of the SSR 220. When some trouble happens at the stage of (a) to cause the heater lamp 20 to remain lighting during a temperature control operation at $T_1$, the temperature of the fixing unit 15 continues increasing. And when the CPU 200 normally operates, the power source 250 is broken at the stage (b) where the temperature at the fixing unit 15 reaches the abnormality-detecting temperature $T_3$, and the temperature decreases.

When the output port $b_1$ is latched on a low level due to the CPU 200 getting out of order, power-breaking is not done at the abnormality-detecting temperature $T_3$, as shown in FIG. 6. Only at the stage (c) where the temperature reaches $T_4$, the temperature fuse 260 is blown, and the temperature of the fixing unit 15 decreases. Fires or the like can be prevented finally by the temperature fuse being blown in this way. But damages of the surrounding parts as a result of heating are serious, and such parts much be replaced.

Figure 7:
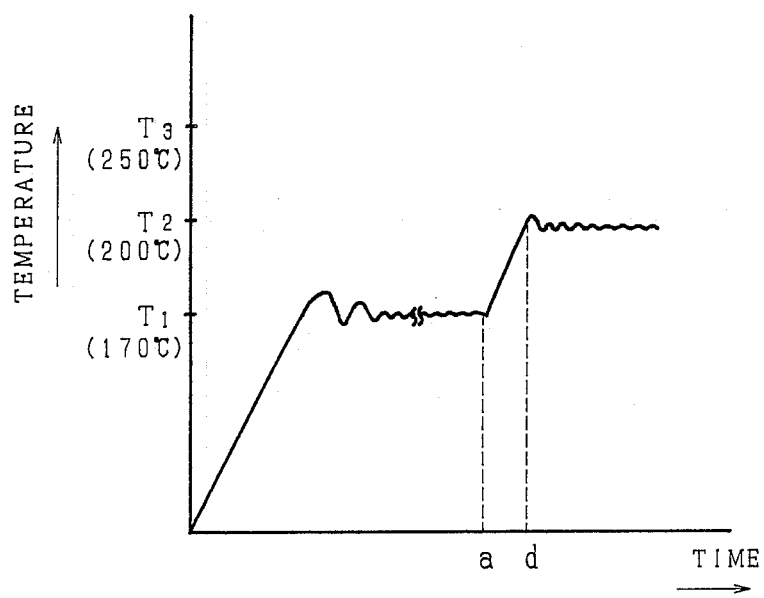

FIG. 7 shows the temperature control in the apparatus according to the present invention. If the output port $b_1$ is latched on a low level due to the CPU 200 getting out of order at the stage (a) during a temperature control operation at $T_1$ in the same way, the temperature of the fixing unit begins to increase. But from the stage (d) where the temperature reaches $T_2$ the temperature control operation through hardware (comparator 230) starts. It is not desirable for the parts that the temperature $T_2$ is set at a very high point, for the temperature control operation through hardware may last for a long time at an abnormal state of software. Therefore, $T_2$ is set at a point (200° C.) which is a little higher than that of $T_1$ (170° C.). It is possible to caution the operator against the abnormal state in software by connecting an indicator such as LED or the like to the output terminal of the comparator 230, for example. Even if an over-shoot, for example, happens to be caused which is higher than $T_2$ due to the thermal time constant of the fixing rollers or the reactivity of the thermister, the temperature control through software is not affected at all, and the temperature of the fixing unit is controlled to be kept at $T_1$.

In this embodiment, a thermister is used for detecting the temperature of the fixing unit (the upper fixing roller). However, it should not be limited to such, and a detecting element such as a current collecting type infrared sensor or the like may also be used.

As mentioned above, in the apparatus according to the present invention, the temperature control operation at the fixing unit can be done normally delicately through software. And if the heater lamp is caused to remain lighting due to software getting out of order because of unexpected noises or the like, the temperature control through software is changed to the temperature control through hardware, which is done at a temperature a little higher than the control temperature through software. Consequently, the temperature of the fixing unit will not continue increasing until the point where the temperature fuse is blown, and that the parts may suffer from thermal damages can be prevented.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. An image forming apparatus provided with a fixing unit where the toner image transferred onto a paper is heated and fixed, comprising;
   a detecting means for detecting the temperature of said fixing unit,
   a first temperature control means for controlling the temperature of said fixing unit to be kept at a first set point,
   a second temperature control means for controlling the temperature of said fixing unit to be kept at a second set point higher than said first set point, and
   a changeover means for changing the temperature control carried out by said first temperature control means to that carried out by said second temperature control means when said detecting means detects a temperature higher than said second set point.

2. An image forming apparatus as set forth in claim 1, wherein said second temperature control means includes an electric circuit.

3. An image forming apparatus as set forth in claim 2, wherein said electric circuit has plural number of resistances and a comparator.

4. An image forming apparatus as set forth in claim 1, wherein said first temperature control means includes a microcomputer for controlling the temperature with program.

5. An image forming apparatus as set forth in claim 1, further comprising a heater lamp, wherein the temperature of said fixing unit is controlled by switch control of said heater lamp.

6. An image forming apparatus as set forth in claim 5, further comprising a means for switching off said heater lamp when said detecting means detects a third set point higher than said second set point.

7. An image forming apparatus as set forth in claim 1, further comprising a temperature fuse which is blown at a fourth set point higher than said second set point.

8. An image forming apparatus as set forth in claim 6, further comprising a temperature fuse which is blown at a fourth set point higher than said third point.

9. An image forming apparatus as set forth in claim 1, wherein said detecting means is a thermister.

10. An image forming apparatus as set forth in claim 1, wherein said image forming apparatus is a copying machine.

* * * * *